PURIFICATION OF p-AMINOPHENOL

Kenneth Cathro Reid, Midlothian, Scotland, assignor to Macfarlan Smith Limited, Edinburgh, Scotland
No Drawing. Filed Dec. 29, 1970, Ser. No. 102,512
Claims priority, application Great Britain, Jan. 28, 1970, 4,021/70
Int. Cl. C07c 89/04
U.S. Cl. 260—575                                      8 Claims

ABSTRACT OF THE DISCLOSURE

A process for the production of p-aminophenol of improved purity by contacting impure p-aminophenol with an extraction medium comprising a non-oxygenated solvent immiscible with water which selectively dissolves the impurities and recovering p-aminophenol of improved purity. The process is applicable particularly to crude p-aminophenol obtained by the catalytic reduction of nitrobenzene with hydrogen under acid conditions. Liquid/liquid contact of an aqueous solution of crude p-aminophenol or its salts with the extraction medium is preferred.

---

The present invention relates to the production of p-aminophenol of improved purity. It particularly relates to the purification of p-aminophenol obtained by the catalytic reduction of nitrobenzene in acid solution.

The crude p-aminophenol produced in such processes as described for example in U.K. specification 713,622 is unstable and tends to darken due to the presence of impurities such as aniline, 4,4'-diaminodiphenylether and o-aminophenol.

In British patent specification No. 1,028,078 there is described and claimed a process for improving the stability of crude p-aminophenol, obtained by catalytic hydrogenation of nitrobenzene under acidic conditions, by washing the crude p-aminophenol with an aliphatic alcohol, preferably isopropanol. Since p-aminophenol has an appreciable solubility in such solvent which is completely water miscible this results in appreciable losses of p-aminophenol.

It has now been found that only very low losses of p-aminophenol occur if a water immiscible solvent is used in which the impurities have a greater solubility than the p-aminophenol.

According to the present invention there is provided a process for the purification of crude p-aminophenol which comprises contacting said p-aminophenol with an extraction medium comprising a non-oxygenated solvent immiscible with water which selectively dissolves the impurities and recovering a p-aminophenol of improved purity.

The process of the invention provides a purification process which involves minimum loss of p-aminophenol, and yields a product which is substantially stable, retains its colour and is suitable for the manufacture of pharmaceutical products and for photographic purposes.

The process of the present invention is particularly applicable to the crude p-aminophenol product obtained by the catalytic reduction with hydrogen of nitrobenzene under acid conditions.

The process of the present invention may be performed at a temperature from ambient temperature up to the boiling point of the extraction medium.

The process of the present invention can be conducted by contacting solid crude p-aminophenol with the extraction medium for example by slurrying the crude p-aminophenol solid with such medium and separating the p-aminophenol from the medium containing the dissolved impurities, either by filtration or centrifugation.

It is preferable, however, particularly for large scale operation to use liquid/liquid contact of an aqueous solution of crude p-aminophenol or its salts with the extraction medium. Such an operation can be effected by extracting an aqueous solution of crude p-aminophenol obtained by catalytic hydrogenation of nitrobenzene in acid medium with the extraction medium and then separating the extraction medium for example by gravity separation and withdrawal.

In this embodiment of the invention the pH of the aqueous phase containing the p-aminophenol is important. Preferably it should be in the range of 4.8 to 5.8, particularly 5.0 to 5.5. Within these ranges the principal impurities in the p-aminophenol, which are aniline and 4,4'-diaminodiphenyl ether are present in the form of free bases instead of being in salt form, and are therefore soluble in the extraction medium.

The organic solvent which comprises the extraction medium is one which is water immiscible and in which the impurities in particular aniline and 4,4'-diamonodiphenyl ether are more soluble than the p-aminophenol. Whether a solvent meets these criteria can be readily determined by simple solubility experiments. Those solvents which dissolve aniline and 4,4'-diaminodiphenyl ether to a greater extent that p-aminophenol can in general be considered for use. A solvent is preferably used in which the ratio of solubility of 4,4'-diaminodiphenyl ether to p-aminophenol is greater than 5:1 and preferably greater than 10:1.

The absolute solubility of 4,4'-diaminodiphenyl ether (DADPE) and the ratio of its solubility to that of p-aminophenol (PAP) in certain specific solvents of use in the process of the invention is given in the following table

| Solvent | X=solubility of DADPE/ solubility of PAP | Y=solubility of DADPE in grams/100 ml. |
|---|---|---|
| Methylene chloride | 14 | 0.75 |
| Chloroform | 19 | 0.52 |
| 1,2-dichloroethane | 12 | 0.60 |
| Carbon tetrachloride | 17 | 0.02 |
| 1,1,1 trichloroethane | 9 | 0.05 |
| 1,1,2 trichloroethylene | 5 | 0.08 |
| 1,1 dichloroethane | 3 | 0.30 |
| 1,1,2,2 tetrachloroethylene | 2 | 0.02 |
| Benzene | 8 | 0.14 |
| Toluene | 8 | 0.09 |
| Xylene | 5 | 0.12 |
| Petroleum ether, B.P. 60-80° C | 4 | 0.07 |

The ratio of solubility of aniline to that of p-aminophenol is greater than the ratio DADPE/PAP for any particular solvent since the absolute solubility of the aniline is in general higher in the extraction medium than that of DADPE.

Preferred classes of solvents include halogenated hydrocarbons, of which methylene dichloride, chloroform, 1,2-dichloroethane, carbon tetrachloride, 1,1,1-trichloroethylene, 1,1-dichloroethane and 1,1,2,2-tetrachloroethylene are representative; aromatic hydrocarbons, of which benzene, toluene and xylene are representative; and petroleum ether having a boiling point range of 60–80° C.; or a mixture of any of these.

Specific preferred solvents are methylene dichloride, chloroform and 1,2-dichloroethane.

In accordance with one embodiment of the present invention the extraction procedure involves a continuous countercurrent liquid/liquid extraction in a packed column, with or without continuous recycling of the extraction medium by distillation, or by contact with an aqueous solution of an acid in order to remove dissolved impurities as salts, or a combination of the two procedures.

The following Examples illustrate the invention:

EXAMPLE 1

450 grams of nitrobenzene (added portionwise) is hydrogenated at 85°–90° C. and approximately one atmosphere total pressure in the presence of 2400 grams of 16% w./w. sulphuric acid and 1.5 grams of Morpan O surface active agent (octadecyltrimethylammonium bromide) with 2 to 5 grams of 1% platinum-on-carbon as catalyst, by one of the known procedures such as that described in B.P. 713,622. At the completion of the hydrogenation the catalyst is removed by filtration, the solution neutralised with ammonia to pH 5.0, treated with 20 grams of activated charcoal, and refiltered. The filtrate is stirred and 2 grams of sodium dithionite are added followed by ammonia to adjust the pH of the solution to 6.5–7.0 to precipitate the crude p-aminophenol. The latter is filtered, washed with water, and sucked as dry as possible on the filter. The damp solid is removed from the filter and vigorously stirred with 1000 ml. of technical grade chloroform or methylene chloride. The resulting slurry is filtered and the solid washed on the filter wtih a further 500 ml. of technical chloroform or methylene chloride. The p-aminophenol thus obtained is heated at 80° C. with sufficient water to dissolve it completely, the hot solution treated with 3 grams of sodium dithionite and 3 ml. of a 47% w./v. solution of the sodium salt of N,N-di-(2-hydroxyethyl) glycine in water, and allowed to crystallise. The p-aminophenol is filtered, washed with a 2% solution of sodium bisulphite in water, and dried in an air oven at 50° C. The product is obtained as a white or off-white crystalline solid which discolours only slowly in air. The yield is 260 grams. On thin layer chromatography (TLC) there was only one spot indicating the absence of impurities.

EXAMPLE 2

The solution obtained after the completion of the hydrogenation reaction and removal of the catalyst by filtration as described in Example 1, is neutralised with ammonia to pH 5.0–5.5, the point just short of that at which precipitation of p-aminophenol occurs. Sodium dithionite (1 gram) is added followed by 500 ml. of technical chloroform or methylene chloride, and the mixture well stirred for 10 minutes. The whole is then filtered to remove any solid phase present and the filtrate allowed to separate by gravity into two layers. The lower chloroform or methylene chloride layer is removed and the aqueous phase re-extracted with two further 500 ml. portions of chloroform or methylene chloride.

The aqueous solution of p-aminophenol obtained after chloroform or methylene chloride extraction is heated to ca. 70° C., treated with 10 grams of activated charcoal and filtered hot. The filtrate is vigorously stirred and 3 ml. of a 47% w./v. solution of the sodium salt of N,N-di-(2-hydroxyethyl)glycine in water added, followed by ammonia to adjust the pH of the solution to 6.5–7.0. Sodium dithionite (2 grams) is added and the solution stirred until crystallisation of the p-aminophenol is complete. The solid is filtered, washed on the filter with a 2% solution of sodium bisulphite in water, and dried in an air oven at 50° C. The yield of p-aminophenol is 280 grams. It is obtained as a white or off-white crystalline solid which discolours only slowly in air and which is suitable for the manufacture of paracetamol and other derivatives of p-aminophenol. It has m.p. 189–190° and assays as 99% to 100% pure.

EXAMPLE 3

The acidic reaction liquor obtained from a 20 gallon scale pilot plant hydrogenation after completion of the reaction and removal of the catalyst as described in Example 1 is adjusted to pH 5.0–5.5 using ammonia, the point just short of that at which precipitation of the p-aminophenol occurs.

The warm solution (temperature 30–50° C.) is then pumped at the rate of 10–15 litres per hour into the base of a 5 ft. x 6 inches diameter glass column packed with ⅝ inch diameter stainless steel or earthenware Raschig rings. Chloroform or methylene chloride is introduced at the rate of about 45 litres per hour at the top of the column by condensing solvent vapour from a recycle still. The chloroform or methylene chloride passes down the column countercurrent to the aqueous solution of crude p-aminophenol and is returned from the base of the column to the recycle still, which contains an aqueous solution of a non-volatile acid (e.g., 50% w./w. sulphuric acid). In this recycle still the solvent is distilled and returned to the column and the impurities removed during the extraction collect in the still as salts of the acid employed. The aqueous solution of p-aminophenol which emerges from the top of the extraction column free from aniline, 4:4' diaminodiphenylether and other impurities, is treated in a manner similar to that described in Example 2 yielding a product of similar quality.

What is claimed is:

1. A process for the recovery in purified form of p-aminophenol prepared by catalytic reduction of nitrobenzene in acid medium whereby aniline and 4,4'-diaminodiphenyl ether are present as impurities, which process comprises contacting a solution of p-aminophenol and said impurities in an aqueous medium having a pH of 5.0 to 5.5 just short of that at which precipitation of p-aminophenol occurs and at which aniline and 4,4'-diaminodiphenyl ether are in the form of free bases with an extraction medium consisting essentially of a non-oxygenated solvent immiscible with water which selectively dissolves the impurities, separating the resulting phases with said p-aminophenol in solution in the aqueous phase and recovering p-aminophenol of improved purity from the aqueous phase.

2. A process for the recovery in purified form of p-aminophenol prepared by catalytic reduction of nitrobenzene in acid medium whereby aniline and 4,4'-diaminodiphenyl ether are present as impurities, which process comprises contacting a solution of p-aminophenol and said impurities in an aqueous medium having a pH of 5.0 to 5.5 just short of that at which precipitation of p-aminophenol occurs and at which aniline and 4,4'-diaminodiphenyl ether are in the form of free bases with an extraction medium consisting essentially of chloroform, methylene chloride or 1,2-dichloroethane to dissolve said impurities therein, separating the resulting phases with said p-aminophenol in solution in the aqueous phase and recovering p-aminophenol of improved purity from the aqueous phase.

3. A process as claimed in claim 1 in which the solvent is one in which the ether impurity is at least five times more soluble than the aminophenol.

4. A process as claimed in claim 3 in which the solvent is one in which the ether impurity is at least ten times more soluble than the aminophenol.

5. A process as claimed in claim 1 in which the solvent is a halogenated hydrocarbon, an aromatic hydrocarbon or a petroleum ether of a boiling range of 60–80° C. or mixtures containing any of these.

6. A process as claimed in claim 5 in which the solvent is methylene dichloride, chloroform, 1,2-dichloroethane, carbon tetrachloride, 1,1,1-trichloroethane, 1,1,2-trichloroethylene, 1,1-dichloroethane or 1,1,2,2-tetrachloroethylene.

7. A process as claimed in claim 5 in which the solvent is benzene, toluene or xylene.

8. A process as claimed in claim 1 in which the acid medium is sulphuric acid.

(References on following page)

References Cited

UNITED STATES PATENTS

| | | | |
|---|---|---|---|
| 2,013,394 | 9/1935 | Tolstoovhov | 260—575 X |
| 3,535,382 | 10/1970 | Brown et al. | 260—575 |
| 2,559,896 | 7/1951 | Patterson et al. | 260—577 X |
| 3,433,788 | 3/1969 | Somekh et al. | 260—577 X |
| 3,717,680 | 2/1973 | Baron et al. | 260—575 |
| 3,694,508 | 9/1972 | Baron et al. | 260—575 |

LORRAINE A. WEINBERGER, Primary Examiner

C. F. WARREN, Assistant Examiner